(12) United States Patent
Hirabe

(10) Patent No.: US 11,126,294 B2
(45) Date of Patent: Sep. 21, 2021

(54) INPUT APPARATUS THAT RECEIVES, AFTER FIXED PERIOD, POSITION ON SCREEN OF DISPLAY DEVICE SPECIFIED BY TOUCH OPERATION

(71) Applicant: KYOCERA Document Solutions Inc., Osaka (JP)

(72) Inventor: Masato Hirabe, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/822,527

(22) Filed: Mar. 18, 2020

(65) Prior Publication Data

US 2020/0319744 A1 Oct. 8, 2020

(30) Foreign Application Priority Data

Apr. 3, 2019 (JP) .............................. JP2019-071469

(51) Int. Cl.
*G06F 3/041* (2006.01)

(52) U.S. Cl.
CPC .......... *G06F 3/0416* (2013.01); *G06F 3/0412* (2013.01); *G06F 3/0414* (2013.01)

(58) Field of Classification Search
CPC .... G06F 3/0412; G06F 3/0414; G06F 3/0416; G06F 3/0488
See application file for complete search history.

(56) References Cited

U.S. PATENT DOCUMENTS

2013/0332892 A1 12/2013 Matsuki
2015/0268802 A1* 9/2015 Kim ...................... G06F 3/0416
715/763

FOREIGN PATENT DOCUMENTS

JP 2013-196463 A 9/2013

* cited by examiner

*Primary Examiner* — Afroza Chowdhury
(74) *Attorney, Agent, or Firm* — IP Business Solutions, LLC

(57) ABSTRACT

An input apparatus includes a display device, a touch panel, and a control device. The control device includes a processor, and as a result of executing a control program by the processor, functions as a controller. When a position on the screen of the display device is specified by touch operation performed on the touch panel, the controller determines the position on the screen of the display device specified by the touch operation based on detection output of the touch panel, withholds reception of the determined position until passage of a predefined fixed period in a state in which the determined position is at a same position, and receives the determined position upon passage of the fixed period.

3 Claims, 9 Drawing Sheets

INPUT APPARATUS THAT RECEIVES, AFTER FIXED PERIOD, POSITION ON SCREEN OF DISPLAY DEVICE SPECIFIED BY TOUCH OPERATION

INCORPORATION BY REFERENCE

This application claims priority to Japanese Patent Application No. 2019-071469 filed on 3 Apr. 2019, the entire contents of which are incorporated by reference herein.

BACKGROUND

This disclosure relates to an input apparatus for inputting touch operation performed on a touch panel provided on a screen of a display device and more specifically to a technology for receiving a position of touch operation.

A typical input apparatus for inputting touch operation performed on a touch panel provided on a screen of a display device includes: the display device; and the touch panel provided on the screen of the display device. For example, when an icon displayed on the screen of the display device is indicated by touch operation by a finger or the like, a position on which the touch operation has been performed is detected on the touch panel and the indicated icon is determined based on the aforementioned position of the touch operation.

Moreover, in a typical user interface device, when a position touched by a finger has been continuously unchanged for predetermined time or longer, a touch focus mode in which the position touched by the finger is monitored without moving an entire image is operated, and when a force of pressing by the finger becomes equal to or greater than a threshold value and also the position touched by the finger is superposed on a display position range of an object before the position touched by the finger is maintained for predetermined time or longer, it is determined that click operation has been performed. Consequently, it becomes possible to execute various types of operation with the finger kept in contact with a touch panel.

SUMMARY

A technology obtained by further improving the aforementioned technology will be suggested as one aspect of this disclosure.

An input apparatus according to one aspect of this disclosure includes a display device, a touch panel, and a control device. The touch panel is provided on a screen of the display device. The control device includes a processor, and as a result of executing a control program by the processor, functions as a controller. When a position on the screen of the display device is specified by touch operation performed on the touch panel, the controller determines the position on the screen of the display device specified by the touch operation based on detection output of the touch panel, withholds reception of the determined position until passage of a predefined fixed period in a state in which the determined position is at a same position, and receives the determined position upon passage of the fixed period.

DETAILED DESCRIPTION

Hereinafter, embodiments of this disclosure will be described with reference to the drawings.

Figure 1:
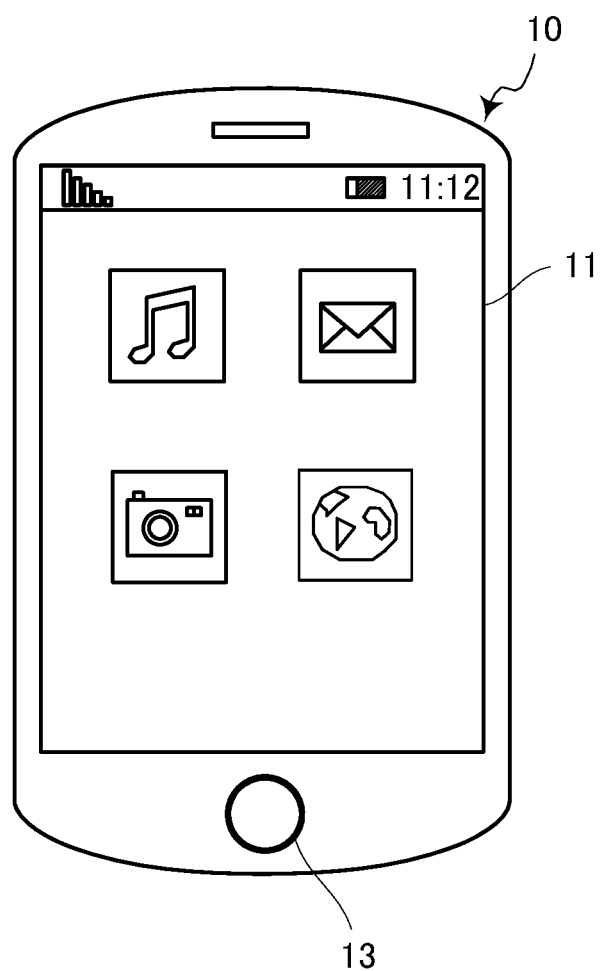
FIG. 1 is a plan view illustrating outer appearance of an information processing apparatus to which an input apparatus according to one embodiment of this disclosure is applied.
Figure 2:
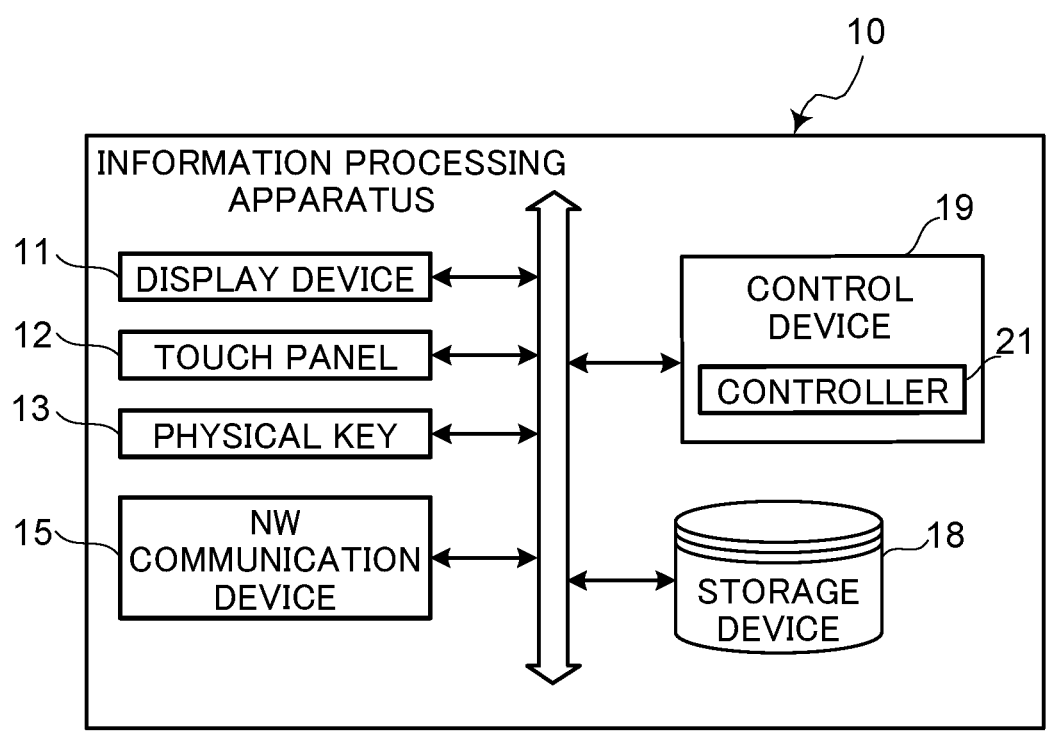
FIG. 2 is a block diagram illustrating inner configuration of the information processing apparatus to which the input apparatus according to one embodiment of this disclosure is applied.

FIG. 1 is a plan view illustrating outer appearance of an information processing apparatus to which an input apparatus according to one embodiment of this disclosure is applied. FIG. 2 is a block diagram illustrating inner configuration of the information processing apparatus to which the input apparatus according to one embodiment of this disclosure is applied.

The information processing apparatus 10 of this embodiment is, for example, a smartphone or a mobile device, and includes: a display device 11, a touch panel 12, a physical key 13, a network communication device (NW communication device) 15, a storage device 18, and a control device 19. These components are capable of transmitting and receiving data or signals to and from each other through a bus.

The display device 11 is formed of a liquid crystal display (LCD) or an organic light-emitting diode (OLED). For example, a plurality of icons are displayed on a screen of the display device 11.

The touch panel 12 is a touch panel of, for example, a resistive film type or an electrostatic capacitive type. The touch panel 12 is arranged on the screen of the display device 11 and detects touch of a finger or the like of a user on the touch panel 12 together with a position of the aforementioned touch, and receives input of a user instruction on the screen of the display device 11. Therefore, the touch panel 12 plays a role as an operation device to which user operation performed on the screen of the display device 11 is inputted.

Moreover, the information processing apparatus 10 includes, in addition to the touch panel 12, the physical key 13 as an operation device to which user operation is inputted.

The network communication device 15 is a communication interface including a communication module such as a local area network (LAN) chip. The network communication device 15 is connected to an external terminal device through a LAN, the Internet, or the like.

The storage device 18 is a storage device such as a random access memory (RAM) or a hard disk drive (HDD), and stores various application programs, various pieces of information, etc.

The control device 19 is composed of a processor, a RAM, a read only memory (ROM), etc. The processor is, for example, a central processing unit (CPU), an application specific integrated circuit (ASIC), a micro processing unit (MPU), or the like. The control device 19 functions as a controller 21 as a result of executing a control program stored in the ROM or storage device 18 by the processor.

The control device 19 is connected to the display device 11, the touch panel 12, the physical key 13, the network communication device 15, the storage device 18, etc., and performs operation control of these components and performs signal or data transmission and reception between the components.

The controller 21 plays a role as a processor which executes various types of processing. Moreover, the controller 21 has a function of controlling display operation of the display device 11 and communication operation of the network communication device 15. Based on detection output of the touch panel 12, the controller 21 also determines touch operation performed on the screen of the display device 11 and also determines the position of the screen of the display device 11 specified by the touch operation.

Here, in the information processing apparatus 10, when the user performs touch operation on the touch panel 12, the controller 21 determines a position of the touch operation and a position on the screen of the display device 11 specified by the touch operation based on detection output of the touch panel 12. Then the controller 21 counts duration time for which a state in which the position specified by the touch operation is unchanged (that is, a state in which the position specified by the touch operation is at the same position) continues. Until this duration time reaches preset specified time, the controller 21 withholds reception of the position specified by the touch operation, and when the duration time reaches the specified time, the controller 21 receives the position specified by the touch operation. When the position specified by the touch operation is moved after receiving the specified position, as described above, the controller 21 withholds reception of the position after the movement until duration time for which a state in which the position after the movement is at the same position continues reaches the specified time and receives the position after the movement when the duration time reaches the specified time.

For example, when duration time of touch operation performed on an icon on the screen of the display device 11 reaches the specified time in a state in which the touch operation is continued at the same position, the controller 21 receives the position on the screen of the display device 11 specified by the touch operation and determines the icon based on the received position. Therefore, the position specified by the touch operation is received and confirmed when the duration time of the touch operation in a state in which the position specified by the touch operation is unchanged reaches the specified time. Consequently, it is possible to effectively prevent erroneous operation caused by positional shift of the touch operation.

Moreover, the controller 21 causes a mark image (hereinafter simply referred to as "mark") indicating a mark (predefined symbol) to be displayed at the position specified by the touch operation and causes a display mode, for example, a color of the mark to be displayed in accordance with passage of the duration time. Consequently, the user can view the color of the mark to predict timing at which the duration time of the touch operation reaches the specified time.

Next, a first embodiment of processing of receiving the position on the screen of the display device 11 specified by touch operation as described above will be described in detail with reference to, for example, a flowchart illustrated in FIG. 3.

Figure 4A:
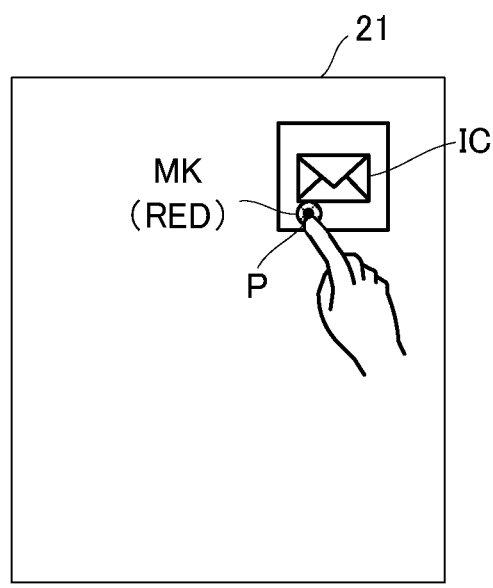
FIGS. 4A and 4B are diagrams illustrating procedures of the touch operation performed in the first embodiment.

When the user of the information processing apparatus 10 has performed touch operation at a desired position P on the screen of the display device 11 as illustrated in, for example, FIG. 4A, the controller 21 detects the touch operation based on the detection output of the touch panel 12 (Yes in step S101) and determines the position (the position on the screen of the display device 11 on which the touch operation has been performed) P on the screen of the display device 11 specified by the touch operation (step S102). Then the controller 21 starts, by a timer built in the control device 19, to count the duration time T in a state in which the position P is at the same position (the same position also includes a case where the position P is within a range of previously defined short distance (for example, 1 mm)) with respect to the previously determined position from a time point of the detection performed in step S101 (step S103). The controller 21 continuously performs the detection of the touch operation and the determination of the position P on the screen of the display device 11 specified by the touch operation after resulting in "Yes" in step S101.

Moreover, the controller 21 causes a mark MK of a circular shape centered at the position P to be displayed in, for example, red at the determined position P on the screen of the display device 11 (step S104). For example, the controller 21 sets a size of the mark MK to be larger than a standard size of a finger so that the size of the mark MK becomes larger than a fingertip of the user who has performed the touch operation on the position P. Consequently, the mark MK is displayed in a manner such as to extend to outer surroundings of the user's fingertip, making it possible for the user to view the mark MK.

Then the controller 21 determines whether or not the duration time T for which the aforementioned position P is at the same position reaches the preset specified time t1 (step S105).

Figure 4B:
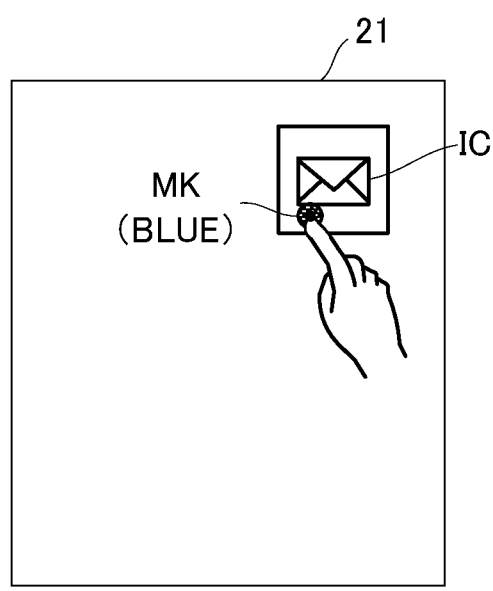

Here, upon determining that the duration time T reaches the specified time t1 in the state in which the position P is at the same position ("Yes" in step S105), the controller 21 receives and confirms the position P determined in step S102 (the position P finally detected upon movement in the range of the short distance) (step S110) and also changes a color of the mark MK to a different display mode, for example, changes the color to display the mark MK in blue, as illustrated in FIG. 4B (step S111). Since the color of the mark MK has been changed to "blue", it is possible for the user to get to know that the position P has been received at a time point of the change to "blue". Note that the controller 21 may change concentration or a blink cycle of the mark MK instead of changing the color of the mark MK.

Then the processing shifts to step S101. Specifically, even when the position specified by the touch operation moves to another position after receiving the position P, the controller 21 withholds reception of the position after the movement until the duration time T reaches the specified time t1 at the position after the movement as described above, and receives the position after the movement when the duration time T reaches the specified time t1.

Moreover, upon determining in step S105 that the duration time T has not reached the specified time t1 ("No" in step S105), the controller 21 determines whether or not the position P determined at any time has moved output of the same position to another position (step S106). Upon determination that the position P is maintained at the same position ("No" in step S106), the processing returns to step S105, where determination on whether or not the duration time T reaches the specified time t1 is continued (step S105).

On the other hand, upon determination by the controller 21 that the position P has moved out of the same position to another position and the position P is not maintained at the same position ("Yes" in step S106), the processing shifts to step S102. The controller 21 performs processing in steps S102 beyond for the position P moved to another position. Consequently, when the position specified by the touch operation has moved after receiving the aforementioned specified position, the controller 21 withholds reception of the position after the movement until the duration time reaches the specified time in a state in which the position after the movement is at the same position as described above, and receives the position after the movement when the duration time reaches the specified time.

Since the position of the touch operation performed immediately before the finger detected by the touch panel separates is received in the typical input apparatus, shift of the finger position immediately before the finger separation also shifts the received position of the touch operation, which contributes to erroneous operation. Moreover, the type of operation is switched in the typical user interface device described above between a case where the finger touch position is maintained for the predetermined time or longer and a case where the finger touch position is not maintained for the predetermined time or longer, but it is assumed that upon shift of the finger position, erroneous operation occurs.

On the contrary, according to the first embodiment, upon determining the position P on the screen of the display device 11 specified by touch operation based on the detection output of the touch panel 12, the controller 21 withholds the reception of the determined position P until the specified time t1 passes in a state in which the determined position is at the same position and receives the determined position P upon passage of the specified time t1. Thus, even when the determined position P has moved to another position after receiving the position P once by the controller 21, the reception of the position P after the movement is withheld until the duration time T reaches the specified time t1 in the state in which the position P moved to another position is at the position after the movement. Thus, even when the finger shifts from the aforementioned position upon separating from the touch panel after ending of the specification of the position by the user's finger, it is possible to accurately receive the position originally specified by the touch panel by the user regardless of the aforementioned finger positional shift and to prevent erroneous operation.

Note that when the position P on the screen of the display device 11 specified by the touch operation continuously determined is continuously at the same position while the duration time T has not reached the specified time t1, the controller 21 may vary the display mode of the mark MK in accordance with passage of the duration time T.

For example, the controller 21 changes the color of the mark MK in accordance with the passage of the duration time T from the time point of the determination made in step S102. Consequently, the user can view the change in the color of the mark MK to detect that the position P of the touch operation is maintained and also detect the duration time T since start of the touch operation. Further, it is also possible for the user to view the color of the mark MK to predict timing at which the duration time of the touch operation reaches the specified time.

Moreover, when the position P received in step S110 is superposed on a region of the icon IC displayed on the screen of the display device 11, the controller 21 may change the color of the mark MK to "blue" and/or may change the color of the icon IC instead of changing the color of the mark MK to "blue".

Figure 3:
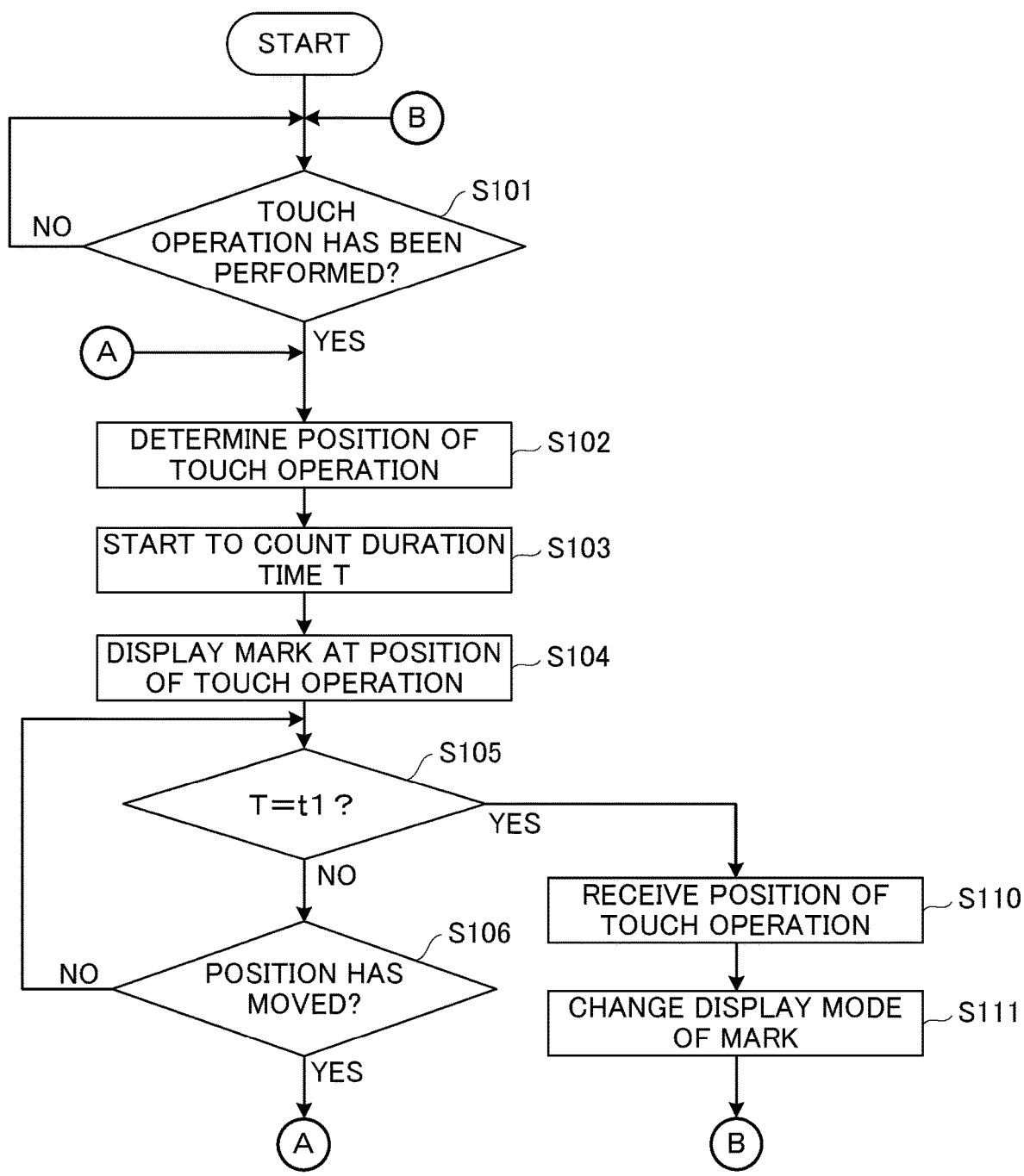
FIG. 3 is a flowchart illustrating procedures of processing for receiving a position on a screen of a display device specified by touch operation and changing a color of a mark at the aforementioned position following passage of time for which the touch operation continues in a first embodiment.

Note that the processing illustrated in FIG. 3 ends when the touch operation is no longer detected based on the output from the touch panel 12.

Next, a second embodiment of processing of receiving the position on the screen of the display device 11 specified by the touch operation will be described.

Adopted as the touch panel 12 of the information processing apparatus 10 in the processing of the second embodiment is the one whose detection output changes in accordance with an area of a region pressed by the touch operation. For example, a touch panel of a resistive film type is adopted. A resistance value between two electrodes in the touch panel of a resistive film type changes in accordance with the area of the pressed region and the detection output thereof changes, so that the controller 21 determines the area of the pressed region based on the aforementioned detection output. That is, the controller 21 determines not only the position of the touch operation but also the area of the region pressed by the touch operation based on the detection output of the touch panel 12.

Here, upon touch operation performed on the screen of the display device 11 via the touch panel 12 by the user in the information processing apparatus 10, the control device 21 determines the position on the screen of the display device 11 specified by the touch operation based on the detection output of the touch panel 12 and also determines the area of the region pressed by the touch operation. The controller 21 withholds the reception of the position specified by the touch operation in a state in which the determined area of the pressed region exceeds a preset specified size, and receives the position specified by the touch operation upon a decrease of the area of the pressed region to the specified size.

Therefore, the user can change the position of the touch operation in a desired manner until the area of the region pressed by the touch operation decreases to the specified size after exceeding the specified size. Moreover, the position of the touch operation is received and confirmed upon the decrease of the area of the region pressed by the touch operation to the specified size. Consequently, it is possible for the user to accurately receive the position originally specified by the touch operation regardless of shift of the finger from the aforementioned position, if any, upon separating the finger from the touch panel after ending of the position specification by the user and to prevent erroneous operation.

Moreover, when touch operation has been performed on the icon on the screen of the display device 11 upon the decrease of the area of the region pressed by the touch operation to the specified size, the controller 21 may receive the position on the screen of the display device 11 specified by the touch operation and determine the icon which has a display region at the received position.

Moreover, upon specifying the position on the screen of the display device 11 by the touch operation performed on the touch panel 12, the controller 21 causes the mark to be displayed at the specified position on the screen, and causes the display mode of the mark to be changed upon the decrease of the area of the region pressed by the touch operation to the specified size. For example, the controller 21 causes the color of the mark to be changed. Consequently, the user can get to know that the position of the touch operation has been received at a time point at which the display mode or the color of the mark has been changed.

Further, the second embodiment of the processing of receiving the position on the screen of the display device 11 specified by the touch operation will be described in detail with reference to, for example, a flowchart illustrated in FIG. 5.

Figure 6A:
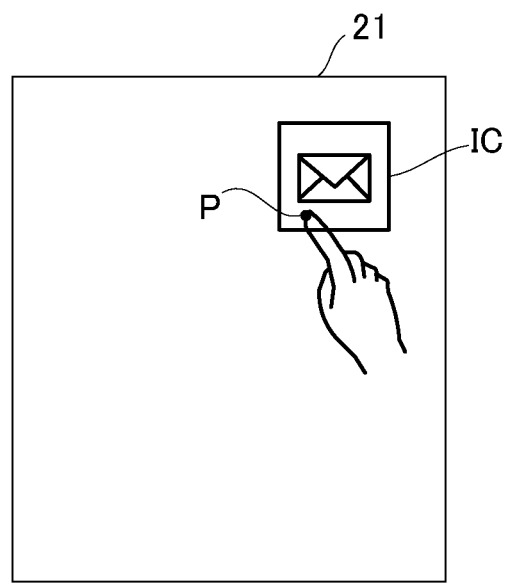
FIGS. 6A to 6C are diagrams illustrating procedures of the touch operation performed in the second embodiment.

For example, upon touch operation performed at a desired position P on the screen of the display device 11 by the user of the information processing apparatus 10 as illustrated in FIG. 6A, the controller 21 detects the touch operation based on the detection output of the touch panel 12 (Yes in step S201), and determines the position (the position on the screen of the display device 11 subjected to the touch operation) P on the screen of the display device 11 specified by the touch operation (step S202). The controller 21 continuously performs the detection of the touch operation and the determination of the position P on the screen of the display device 11 specified by the touch operation after resulting in "Yes" in step S201.

Further, the controller 21 determines an area S of the region pressed by the touch operation based on the detection output of the touch panel 12 under condition that the position P on the screen of the display device 11 specified by the touch operation continuously determined is continuously at the same position (step S203), and determines whether or not the area S of the pressed region exceeds a preset specified size s1 (for example, 100 mm$^2$) (step S204). Upon determination by the controller 21 that the area S of the pressed region does not exceed the specified size s1 ("No" in step S204), the processing returns to step S202. Therefore, when the area S of the region pressed by the touch operation does not exceed the specified size s1, the processing in steps 202, 203, and S204 is repeated and the processing in steps 205 beyond for receiving the position of the touch operation is not performed.

Figure 6B:
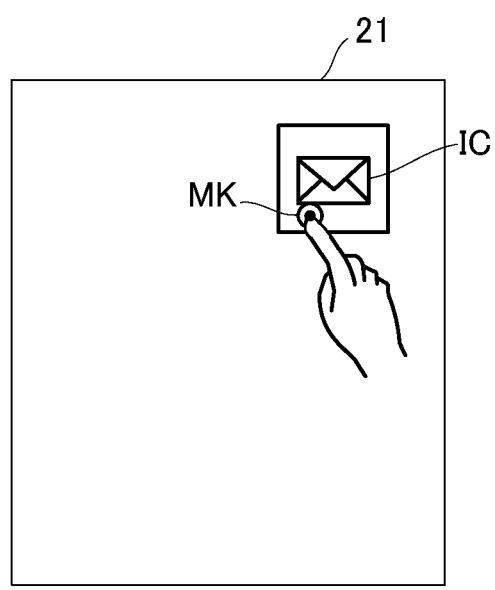

Moreover, upon determining that the area S of the pressed region exceeds the specified size s1 ("Yes" in step S204), the controller 21 causes the mark MK of a circular shape centered at the position P determined in step S202 to be displayed on the screen of the display device 11 as illustrated in FIG. 6B (step S205). The controller 21 preferably causes the mark MK to be displayed in a size preset that the size of the mark MK becomes larger than the user's finger which has performed the touch operation at the position P.

Then the controller 21 continues the determination of the area S of the region pressed by the touch operation (step S207), and then determines whether or not the area S of the pressed region has become equal to or less than the specified size s1 (step S208). Immediately before ending of the touch operation at the same position by the user, the area S of the region pressed by the touch operation becomes small; therefore, such determination is performed in order to detect that it is time immediately before the ending of the touch operation.

For example, upon determination by the controller 21 that the area S of the pressed region has not become equal to or less than the specified size s1 ("No" in step S208), the processing returns to step S207. Therefore, the processing in steps S207 and S208 is repeated in a state in which the area S of the region pressed by the touch operation does not become equal to or less than the specified size s1.

Figure 6C:
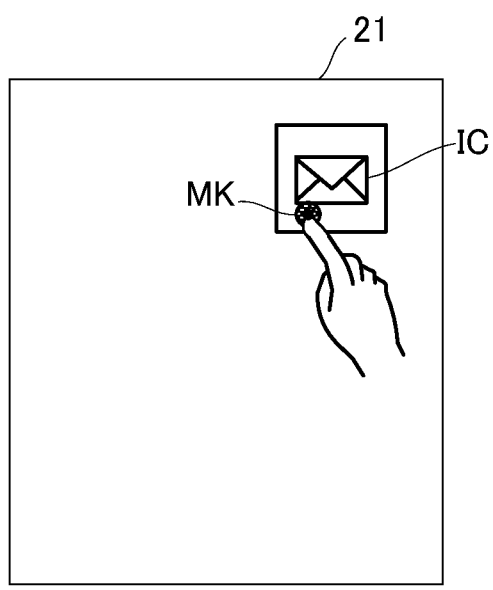

On the other hand, upon determining that the area S of the pressed region has become equal to or less than the specified size s1 ("Yes" in step S208), the controller 21 receives and confirms the position P determined in step S202 (step S209), and also causes the color of the mark MK to be displayed as illustrated in FIG. 6C (step S210). Based on the fact that the color of the mark MK has been changed, the user can get to know that the position P has been received at a time point of this color change. Note that the controller 21 may change concentration and a blink period of the mark MK instead of changing the color of the mark MK.

For example, when the received position P is superposed on the icon IC displayed on the screen of the display device 11, the controller 21 determines the icon IC based on the received position P. At this point, the controller 21 may change the color of the mark MK and at the same time may change a color of the icon IC.

Figure 5:
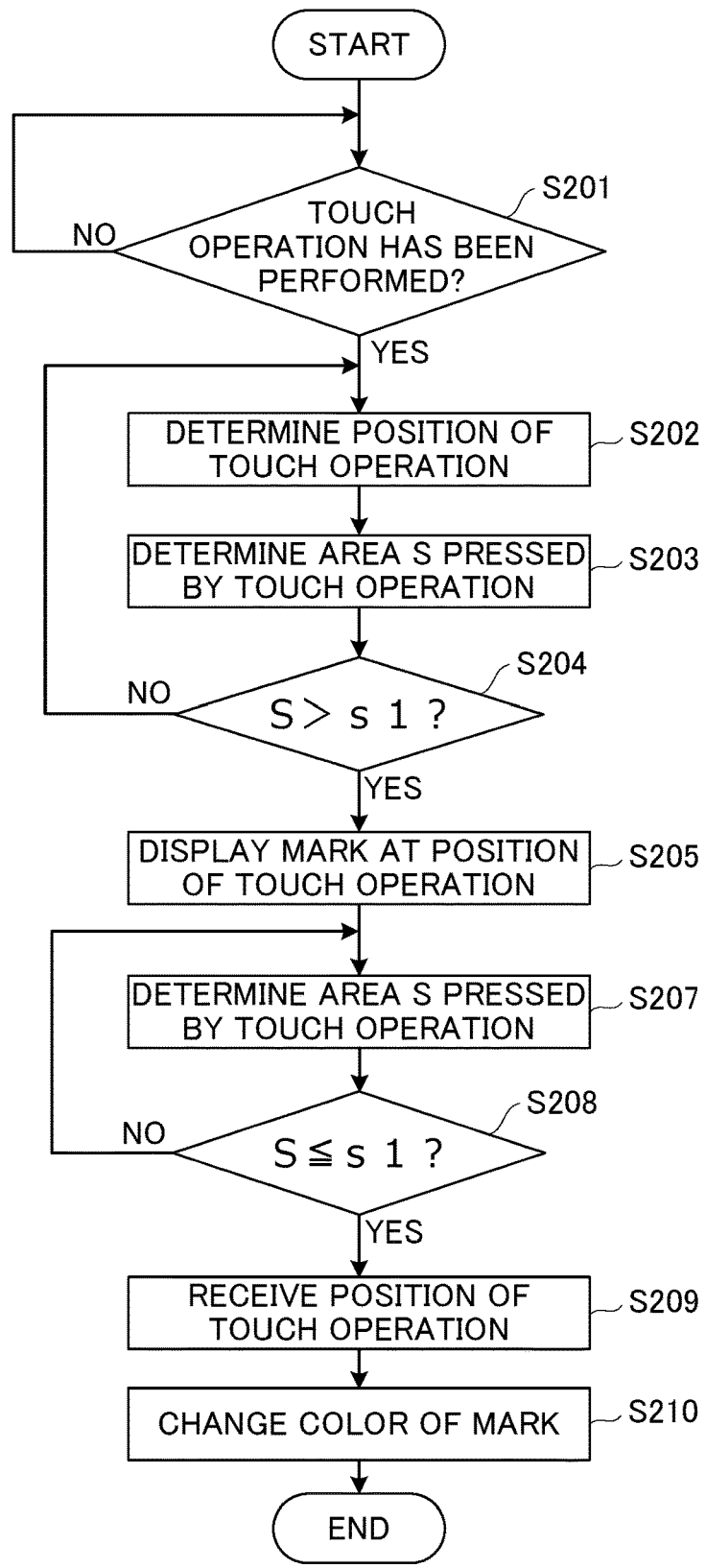
FIG. 5 is a flowchart illustrating procedures of processing for receiving a position on a screen of a display device specified by touch operation and changing a color of a mark of the aforementioned position in accordance with a change in an area of a region pressed by the touch operation in a second embodiment.

The processing illustrated in FIG. 5 ends when the controller 21 no longer detects the touch operation based on the output from the touch panel 12.

Note that upon determining that the position P subjected to the touch operation has moved out of the same position to another position while the processing in steps S202 to S208 described above is performed, the controller 21 performs the processing in steps S202 to S208 for the touch operation at the moved position P.

In the second embodiment as described above, the area S of the region pressed by the touch operation is determined, the reception of the position specified by the touch operation is withheld in the state in which the area S of the pressed region exceeds the specified size s1 and the position P specified by the touch operation is received upon the decrease of the area S of the pressed region to the specified size s1. Even when the determined position P has moved to another position after receiving the position P once by the controller 21, the area S of the region pressed by the touch operation is similarly determined in a state in which the position P moved to another position is at the position after the movement, the reception of the position specified by the touch operation is withheld in the state in which the area S of the pressed region exceeds the specified size s1, and the position P specified by the touch operation is received upon the decrease of the area S of the pressed region to the specified size s1. Thus, even when the finger has moved from the aforementioned position to another position as a result of shifting of the finger upon separation of the finger from the touch panel after the position specification with the finger by the user, the another position is not immediately received; therefore, it is possible for the user to accurately receive the position originally specified by the touch operation by the user regardless of the finger positional shift and to prevent erroneous operation.

Note that the area S of the region pressed by the touch operation is determined based on the detection output of the touch panel 12 in the second embodiment, but a press force Q of pressing by the touch operation may be determined for use. In this case, adopted as the touch panel 12 is the one whose detection output changes in accordance with the press force Q of pressing by the touch operation. For example, the value of resistance between the two electrodes changes in accordance with the press force and the detection output thereof changes, and thus the press force Q is determined based on the detection output of the touch panel of a resistive film type. The controller 21 determines not only the position P of the touch operation but also the press force Q of pressing by the touch operation based on the detection output of the touch panel 12, withholds reception of the position P of the touch operation in a state in which the determined force of pressing Q exceeds a preset specified pressure q1, and receives the position P of the touch operation upon a decrease of the determined force of pressing Q to the specified pressure q1. That is, the processing of FIG. 5 is performed by use of the press force Q instead of the pressed area S.

This disclosure is not limited to the configuration of the embodiments described above and various modifications to this disclosure is permitted. The configuration of the embodiments described above with reference to FIGS. 1 to 6C form just one example of this disclosure and there is no intension to limit this disclosure to the aforementioned configuration.

While the present disclosure has been described in detail with reference to the embodiments thereof, it would be apparent to those skilled in the art the various changes and modifications may be made therein within the scope defined by the appended claims.

What is claimed is:

1. An input apparatus comprising:
   a display device;
   a touch panel provided on a screen of the display device; and
   a control device including a processor, and as a result of executing a control program by the processor, functioning as a controller, the controller, when a position on the screen of the display device is specified by touch operation performed on the touch panel, determining the position on the screen of the display device specified by the touch operation based on detection output of the touch panel, withholding reception of the determined position until passage of a predefined fixed period in a state in which the determined position is at a same position, and receiving the determined position upon passage of the fixed period,
   wherein the controller determines, based on the detection output of the touch panel, an area of a region pressed by the touch operation performed on the touch panel in addition to the position on the screen of the display device specified by the touch operation, withholds reception of the determined position on the screen of the display device specified by the touch operation during a period for which the determined area of the pressed region exceeds a preset specified size where the fixed period is defined as a period for which the determined position is at the same position and the determined area of the pressed region exceeds the specified size, and receives the determined position on the screen of the display device specified by the touch operation when the determined area of the pressed region is decreased to the specified size,
   wherein when the position on the screen of the display device is specified by the touch operation performed on the touch panel, the controller causes the display device to display a mark image, which is different from an icon that superposes the specified position, at the specified position on the screen and change either of a color, concentration, and a blink period of the mark image when the area of the pressed region is decreased to the specified size.

2. The input apparatus according to claim 1, wherein the controller causes the display device to display the mark image in a size preset to include the determined position and be larger than a standard size of a finger.

3. An input apparatus comprising:
   a display device;
   a touch panel provided on a screen of the display device; and
   a control device including a processor, and as a result of executing a control program by the processor, functioning as a controller, the controller, when a position on the screen of the display device is specified by touch operation performed on the touch panel, determining the position on the screen of the display device specified by the touch operation based on detection output of the touch panel, withholding reception of the determined position until passage of a predefined fixed period in a state in which the determined position is at a same position, and receiving the determined position upon passage of the fixed period,
   wherein when the position on the screen of the display device is specified by the touch operation performed on the touch panel, the controller determines, based on the detection output of the touch panel, a force of pressing by the touch operation performed on the touch panel in addition to the position on the screen of the display device specified by the touch operation, withholds reception of the determined position on the screen of the display device specified by the touch operation during a period for which the determined force of pressing exceeds a preset specified pressure where the fixed period is defined as a period for which the determined force of pressing exceeds the specified pressure, and receives the determined position on the screen of the display device specified by the touch operation when the determined force of pressing is decreased to the specified pressure,
   wherein when the position on the screen of the display device is specified by the touch operation performed on the touch panel, the controller causes the display device to display a mark image, which is different from an icon that superposes the specified position, at the specified position on the screen and change either of a color, concentration, and a blink period of the mark image when the determined force of pressing is decreased to the specified pressure.

* * * * *